INVENTOR
JERAULD G. WRIGHT
BY- Smart & Biggar
ATTORNEYS

INVENTOR
JERAULD G. WRIGHT
BY— *Smart & Biggar*
ATTORNEYS.

United States Patent Office 3,220,252
Patented Nov. 30, 1965

3,220,252
INTEGRATED DESTINATION INDICATOR
Jerauld George Wright, Dartmouth, Nova Scotia, Canada, assignor to Her Majesty the Queen in right of Canada as represented by the Minister of National Defence
Filed Feb. 13, 1961, Ser. No. 88,906
Claims priority, application Canada, Feb. 15, 1960, 792,516
7 Claims. (Cl. 73—178)

This invention relates to a new and improved destination indicator for aircraft. More particularly it relates to a destination indicator in which directional data from various sources both absolute and relative in character may selectively be presented to the pilot in a simplified presentation which provides both steering and orientation indications.

Recent improvements in navigational aids have led to the introduction of a greatly increased number of dials and indicators on the pilot's control panel and upon which a variety of navigational and steering indications are displayed. Some of these indications such as radio compass bearings, certain tactical commands and certain steering indications are of the relative variety, that is to say they are expressed in terms of direction relative to the aircraft heading. Other indications are of the absolute form that is to say, they are expressed as magnetic or true bearings. Examples of the latter are dead reckoning indications such as are produced for instance in the Wright et al. Canadian Letters Patent No. 537,812 dated March 5, 1957, or in position indicators of one sort or another. In addition, some indications are conventionally expressed as true bearings and some as magnetic bearings while some relate to information regarding the aircraft's track and others relate to its heading. In the result, the full benefits of recent years have in part been lost because the cluttering of the pilot's control panel with a number of indications differing in nature and character is confusing to the pilot and requires more attention than is justified inasmuch as the pilot's main concern should be to fly and manoeuvre the aircraft, and since he can in fact only obey one steering command at a time.

One of the basic sources of directional information in any aircraft is the magnetic compass. This varies in complexity depending upon the aircraft concerned, all the way from simple oil immersion compasses to highly precise gyroscopically stabilised instruments. Whatever the degree of complexity of the instrument which produces the indication of magnetic north, this indication if the primary source of orientation and such indications as tract, true heading, etc. are all derived from it by appropriate additions or subtractions based upon such additional information as may be available. The pilot of an aircraft should always have available a reliable indication of magnetic heading regardless of the operation or failure of such auxiliary navigational aids as may be available. Thus, although simplification of presentation has always been regarded to be very desirable, it has been clearly recognised that such simplification cannot be made at the expense of not providing the pilot with a reliable indication of magnetic heading.

According to the present invention a destination indicator for an aircraft comprises movable dial means having a scale thereon graduated in degrees of azimuth; fixed index means for said scale; servo drive means for said dial means arranged continuously to drive said dial means to a position corresponding to the heading of the aircraft in response to heading data supplied from a selected source within the aircraft; manually operable means arranged to change the selected source of heading data to which said servo drive means responds; adjustable index means operably associated with said dial means; and means for adjusting said adjustable index means to indicate a command azimuth heading on said scale.

Preferably said manually operated means arranged to change the selected source of heading data comprises emergency selector switch means which may in addition to changing the selected heading source may in the case where the servo drive means are not functioning render said adjustable index means inoperative and cause the means for adjusting said index to drive said dial means.

According to a feature of the invention a destination indicator for an aircraft may comprise a movable dial means having a scale thereon graduated in degrees of azimuth; a drive shaft for said dial means; fixed index means for said scale; servo drive means for said dial means arranged to continuously drive said drive shaft and hence said dial means to a position corresponding to the magnetic heading of the aircraft in response to heading data supplied from a selected source within the aircraft; adjustable index means operably associated with said dial means; a drive shaft for said adjustable index means; differential means connected between said drive shaft for said dial means and said drive shaft for said adjustable index means, said differential means having an input shaft; synchro drive means for said input shaft arranged to drive the latter in response to input data supplied within the aircraft from a source of directional data relative to the heading of the aircraft; selector switch means arranged to selectively energize one of other of said synchro drive means from a selected source of input data; a drift angle indicator; drive shaft means for driving said indicator to indicate an angular position with respect to said fixed index to represent a drift angle; second differential means; means for transmitting to said second differential means as a first input thereto the analogue of shaft position of said drive shaft for said adjustable index means, means for transmitting to said second differential means as a second input thereto, a compatable analogue of the shaft position of the drift angle indicator drive shaft, said second differential means being adapted on energization thereof to transmit an analogue signal of the difference of said analogue as a command azimuth signal to an auto pilot controlling the flight of said aircraft; control circuit means arranged on actuation to energize said second differential means, and maintain it energized until said auto pilot has brought the aircraft onto a course corresponding to zero difference signal; and manually operable actuating switch means for said control circuit.

Preferably the differential means is a differential synchro having a rotatable casing and a rotor therein, mechanical connections being provided between said rotor and the adjustable index drive shaft and between said rotatable casing and the drift angle indicator drive shaft.

According to a further feature of the invention manually operable means may be provided to operatively disengage the adjustable index means for its synchro drive means and to permit the aircraft pilot to adjust the adjustable index means to his own selected heading.

The following is a description by way of example of one embodiment of the present invention, reference being had to the accompanying drawings in which:

FIGURE 3 is set out on two sheets indicated as FIGURE 3 and FIGURE 3A.

Figure 1:
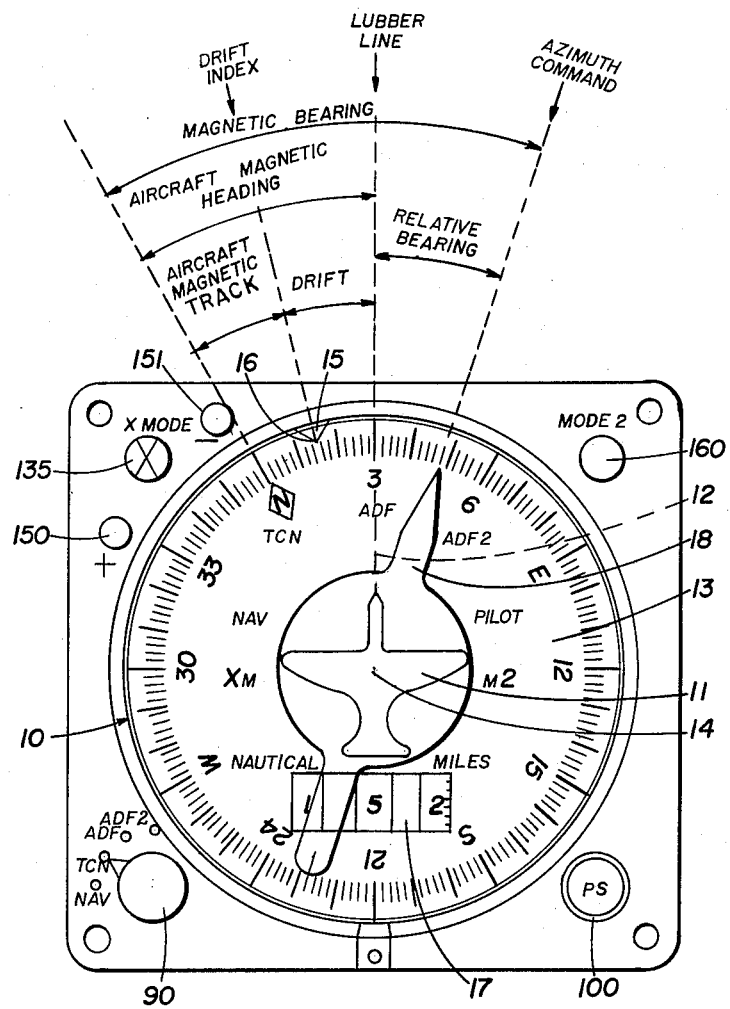
FIGURE 1 is a front view of the presentation of the indicator according to the present invention.

Referring now more particularly to the drawings, in FIGURE 1 the face of the instrument in accordance with the present invention is generally indicated at 10. The heading of the aircraft is indicated by the centrally positioned flat facsimile 11 with the index pointer or lubber line 12, both of which are fixed on the transparent front panel of the instrument. The azimuth indicator dial 13 rotates about the central axis 14 of the indicator. The indicator dial 13 is graduated as a compass card and the heading of the aircraft is read in degrees of azimuth underneath the lubber line 12.

Drift angle is indicated by the drift index, or marker, 15 in degrees right or left of heading. The drift index 15 rotates about the axis 14 so that in the presentation given to the pilot an imaginary line joining the pointer 16 of index 15 with the central axis 14 of the instrument represents track in a manner which is pictorially correct.

Below the facsimile 11 is the counter 17 on which may be indicated miles to travel to an objective or base. The counter 17 is mounted in the body of the instrument behind the dial 13, the latter being preferably formed from a transparent material such as Lucite which enables illumination of the azimuth graduations in a manner which produces a minimum of glare.

Also mounted for rotation about the axis 14 of the instrument and preferably positioned between the front glass of the instrument and the azimuth dial 13 is the command azimuth indicator 18. The command azimuth indicator may be motivated from one of a number of different sources. In general, the position of the command azimuth indicator 18 may be set to receive information from a source selected by the pilot such as from the navigator, or from either one of two radio compasses, or the pilot himself may set in a command azimuth of his own. In addition the azimuth command indicator may be made to indicate the direction of an objective from a tactical command system during interception or homing operations when arranged to receive information from a system such as that designated TACAN.

*Heading*

An electrical analogue of aircraft heading is obtained from a source external of the instrument, say, the aircraft's main gyro or from an instrument such as described and claimed in the Wright copending application Serial No. 792,521 filed February 15, 1960, and is applied to a heading synchro transformer 25 having a fixed case and a rotatable shaft 25a. From the synchro transformer the analogue of heading, as a shaft rotation, is transmitted to the compound gear 27 having outputs to one side of a gear differential generally indicated at 28 and to a gear 29, shaft 30 and gear 31 direct to the compass card or dial 13 of the instrument. The heading synchro transformer 25 forms with its associated driving motor 32 a closed servo loop. Input of heading analogue information as a voltage to the synchro transformer 25 on line 25b causes an error signal to be generated therein, which error signal is amplified in an amplifier 33 and applied to the heading motor 32 which then acts to rotate by means of gear 32a the large gear 34 of the compound gear 27 associated with the heading transformer 25 to apply the necessary correction to the heading card.

*Drift*

An electrical analogue of aircraft drift is obtained from a source external of the instrument, for example a Doppler radar, and is applied on line 40a to the drift control transformer 40 in the form of an electrical signal, is converted to a mechanical analogue therein, and expressed as a shaft rotation of shaft 41. Gear wheel 42 being integral with shaft 41, causes the geared wheel 43 and its associated drift index 15 to be positioned to the left or right of the lubber line 12 in accordance with the drift analogue. Power to drive the index 15 is obtained from the motor 45 in the following fashion. An electrical error signal is generated in the transformer 40 when the analogue of drift is applied thereto and this error signal is transmitted to amplifier 46 and the amplified output signal from the amplifier 46 is applied to the variable phase of the drift synchro motor 45 in the instrument. The motor 45 then positions the drift index 15 through gears 72, 73, 74, 75, shaft 41 and gears 42, 43.

In addition motor 45 turns the geared outer case 73a of the synchro 70 and the geared outer case 81 of the fine steering potentiometer 71 through gear 72 and gear train 74, 75, 80. The geared outer case 81 of the fine steering potentiometer 71 is integral with the case of rotating switch 82 and thus the switch 82 is also actuated. The switch 82 will be discussed later in connection with the auto pilot and fine steering operation.

Figure 2:
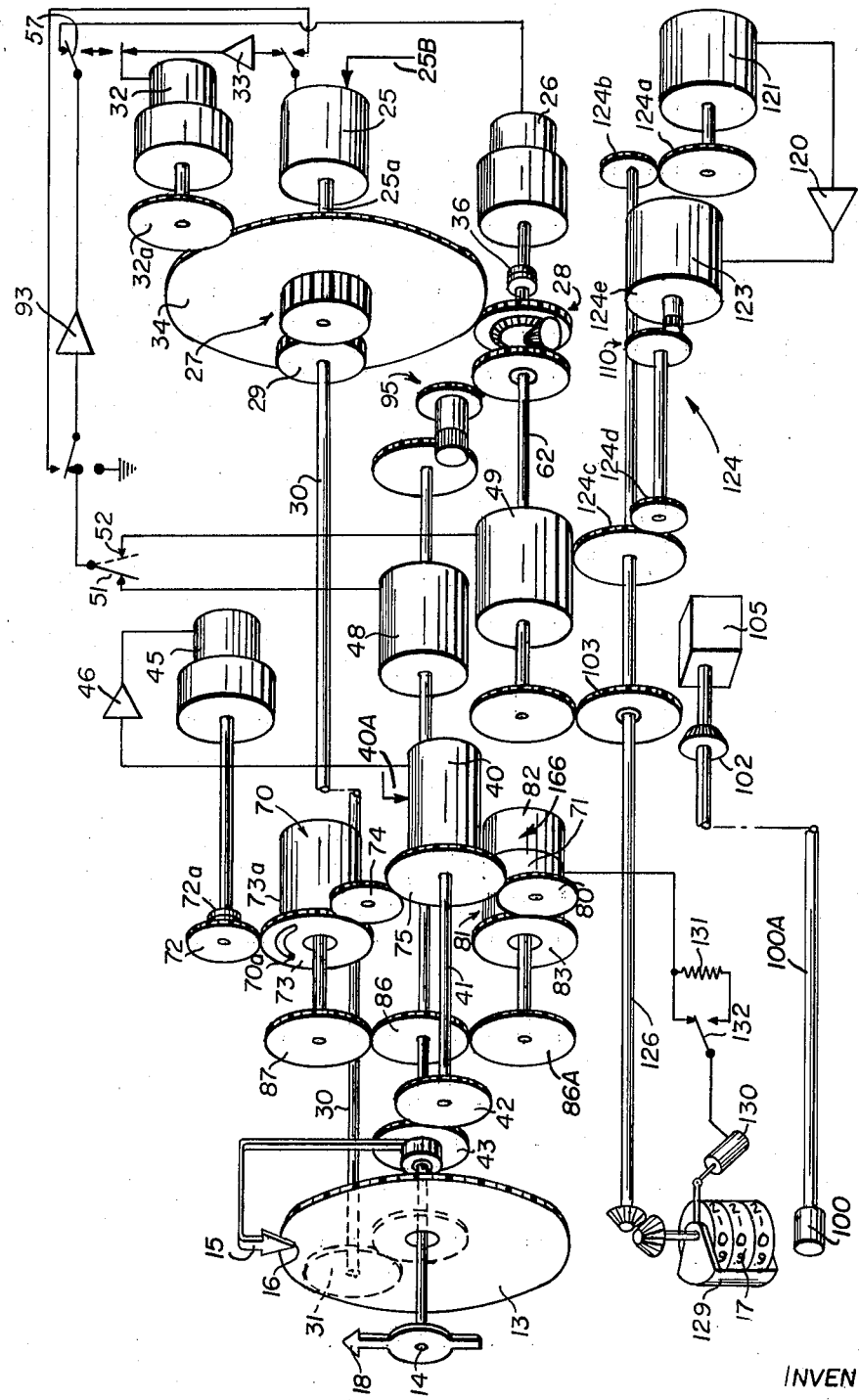
FIGURE 2 is a functional schematic of the components in a preferred embodiment of the present invention.

The maximum drift angle which may be displayed in the instrument is 60° left or right of heading. The gear 73 on the synchro 70 is slotted to provide fixed limit stops at approximately 62° to the left or right which stops are engaged by a pin 70a in the synchro 70. The purpose of the stops is to limit the travel of the gear 73 and thus of the drift index to prevent it from being damaged if drift angles greater than 60° are transmitted to the instrument. The gear 72 is fitted with a friction type hub diagrammatically illustrated as 72a in FIGURE 2 so that when slotted gear 73 reaches the limit stops the motor 45 will still continue to turn but the friction hub 72a will slip and thus prevent damage to either the gear or the drift servo motor gear box.

The azimuth command indicator 18 displays to the pilot the command heading or command track which he is to fly. When the azimuth indicator 18 is aligned with the lubber line 12 on the instrument face the aircraft is steering the command heading and when the azimuth indicator is aligned with the drift index 15 then the aircraft is flying the necessary heading to make good the command track.

Figure 3:
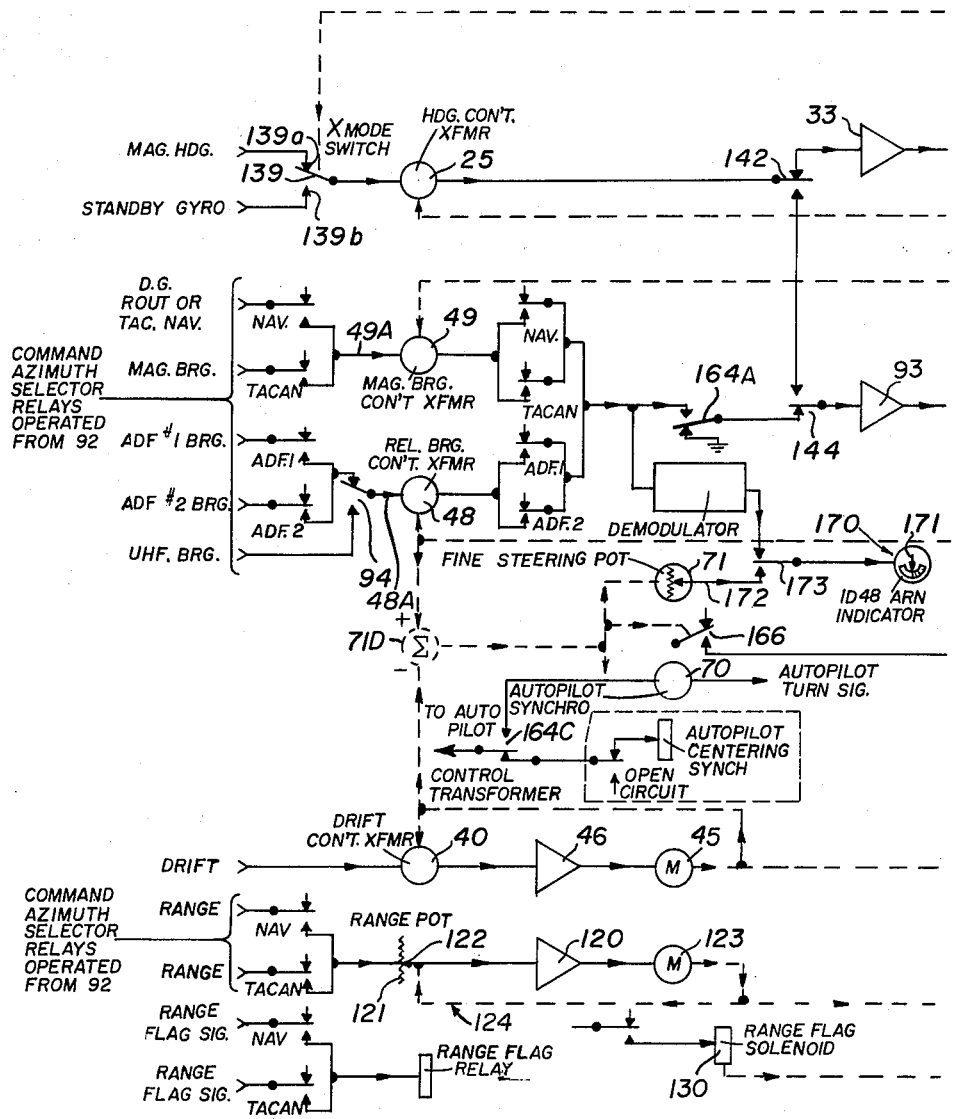
FIGURE 3 is a diagrammatic representation of the information flow in the device, for convenience

As has been mentioned, the azimuth command indicator may receive its command information from one of a series of sources under the selection of the pilot. At the bottom left hand corner of the instrument (FIGURE 1) there is located an azimuth selector switch 90 which is operated by the pilot to select through relay indicated as 92, in FIGURE 3A one of "NAV," "TCN," "ADF," or "ADF2," namely the aircraft navigator, Tacan, or one of two radio compasses. Depending upon the command information selected, the command azimuth pointer 18 will be driven by motor 26 (FIGURES 2 and 3), in accordance with error signals generated in synchro transformers 48 or 49. Selection of TCN, ADF or ADF2 lights an appropriate indicator light on the instrument bezel. External of the instrument and usually mounted on an overhead panel at the pilot's station is an "ADF–UHF" change-over switch 94 (FIGURE 3). Operation of the switch 94 overrides the selector switch 90 on the instrument, so that with the azimuth selector switch 90 in either ADF or ADF2 positions, and the ADF–UHF switch 94 in the ADF position, the input to the synchro 48 on line 48a will be from ADF in the form of an electrical analogue of relative bearing, but if the switch 94 is in UHF position a UHF relative bearing signal will be transmitted to the synchro 48 on line 48a in the instrument. Either of the synchro 48 or 49, amplifier 93 and motor 26 form a servo loop. The error signal from the synchro 48 whether it originates with the ADF or the UHF is amplified by amplifier 93 and applied to motor 26, which motor supplies power through the differential 28 and the gear train 95 to balance the error signal in the synchro transmitter 48. The command azimuth indicator 18 thus is moved to take up a position which indicates to the pilot the relative bearing of the transmitting station in the manner of a radio compass.

In the "NAV" selection on switch 90 the command azimuth indicator 18 is under direction from the aircraft navigator who can set into the instrument the command track or command heading which the pilot is to steer. There is no necessity therefore for the navigator to call up a course to steer on the intercommunication system.

It is only necessary for the navigator to apply the command information as an input voltage to the synchro 49 via the line 49a. A suitable instrument whereby the navigator may introduce his azimuth information is described in the copending application Serial No. 792,521. The selection of "NAV" closes the switch 51 to make contact 52 thereby cutting out synchro 48 and introducing the synchro 49. Thus the error signal produced in the synchro 49 is transmitted to amplifier 93, through switch 57 to motor 26, switch 57 being in the position shown in FIGURE 2, which motor drives the pointer 18 through slip clutch 36, differential gear 28, and gear train 95 to give the pilot the necessary course to steer for a given datum. The "NAV" selection also lights up the "NAV" indicator light 96 on the instrument bezel.

The information being inserted by the navigator is received by the command azimuth synchro 49 as a magnetic geographical bearing. From FIGURE 2 it will be observed that the information applied as output from the command azimuth synchro 49 is applied as a shaft rotation to the shaft 62 which is coupled to one side of the gear differential 28. Since the other side of the gear differential 28 has applied thereto a shaft rotation analogous with aircraft heading from gear 34, the differential 28 acts to algebraically add the shaft rotation of the shaft 62 and the heading analogue so as to transmit through the gear train 95 to the azimuth command indicator 18 a bearing which is relative to the casing of the instrument.

At the bottom right corner of the instrument (FIGURE 1) is a pilot selector knob (PS) No. 100 which enables the pilot to disengage the instrument from the aforementioned external sources of command and leaves him free to select his own command azimuth and apply the same to the pointer 18.

The operation of pushing in the pilot's selector knob engages the cone gear 102 on the shaft 100A with the gear 103 and operates a micro switch 105 thereby disabling the motor 26 by disconnecting its fixed phase (not shown). The "Pilot" lamp 106 is illuminated on the face of the instrument. The friction clutch 36 on the output shaft from the motor 26 slips and permits the entire azimuth gear train (differential 28 and gear train 95) and pointer 18 to be positioned manually by the pilot. The pointer will remain in the position so selected with respect to the heading card 13 until the pilot selector knob is pulled out. When the pilot selector knob is pulled out, the cone gear 102 disengages from the gear 103 and the micro switch 105 is operated to connect the fixed phase of the motor 26. The command azimuth pointer 18 will then take up a position to indicate the bearing which is received thereby depending upon the source of information selected by the azimuth selector switch 90.

*Range*

Figure 3A:
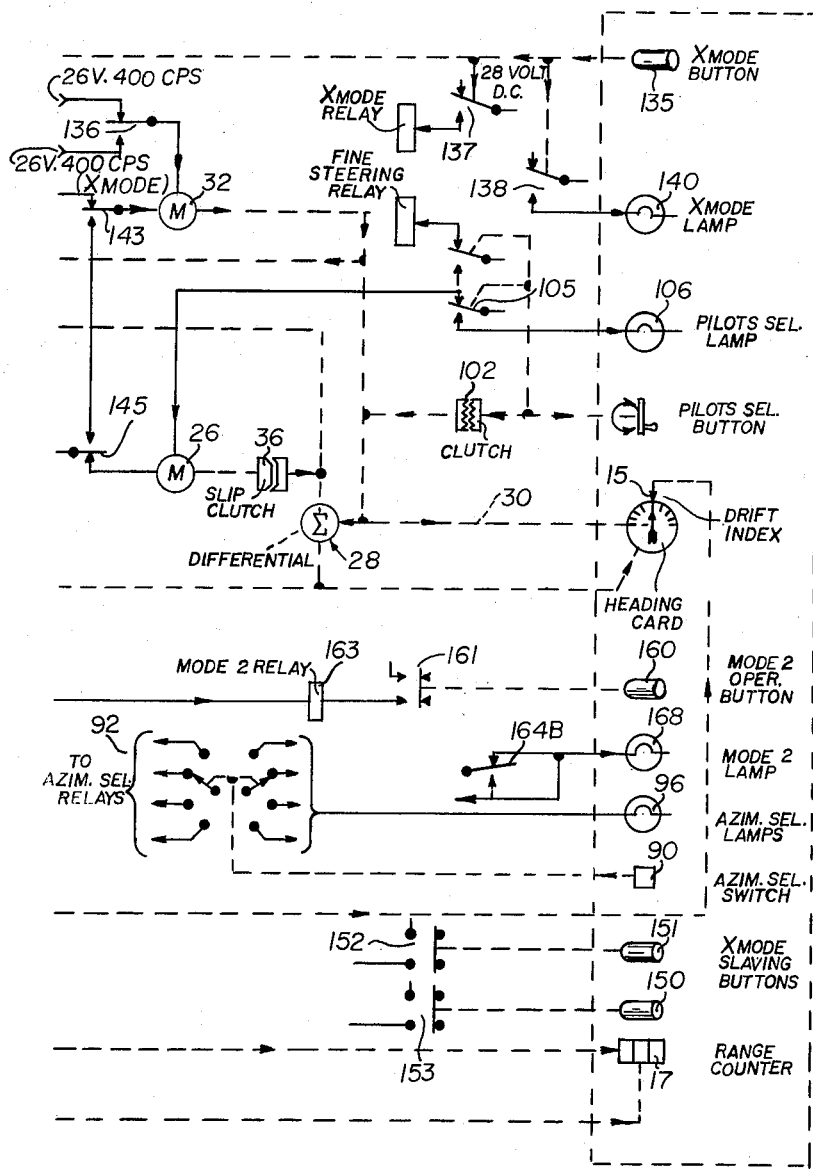

As has been indicated hereinbefore the range counter 17 operates only when TACAN or NAV is selected on the switch 90 of the instrument. Range is transmitted when one of these selections is made from a potentiometer external of the instrument and applied to the instrument through relays 92 (FIG. 3A). The selector switch 90 on the instrument connects the appropriate range signal through the selector relays with either the Navigator or TACAN source. The signal is applied to the balancing potentiometer 121 (FIGURE 3), the wiper 122 of which is mechanically coupled in servo "follow-up loop" fashion to the motor 123. This potentiometer is a 10 turn position potentiometer. If the voltage from the wiper 122 of the potentiometer 121 differs from that of the remote transmitter, an error signal is produced across the range amplifier 120 input. This signal is amplified and fed back to the variable phase of the range motor 123 which positions the wiper 122 through gear train 124, comprising gears 124a, 124b, 124c, 124d and slip clutch 124e to reduce the error signal to zero and at the same time positions the range counter 17 to repeat the analogue signal of the remote transmitter by means of shaft 126. The range counter is provided with a solenoid operated shutter 129. When the solenoid 130 is energized the shutter 129 covers the range counter 17. On the input side of the solenoid 130 there are provided a resistor 131 and a shortening switch 132 so that if the solenoid moves to the limit of its travel, the switch is operated and the resistor is placed in series with the solenoid, thus reducing the power dissipation in the solenoid for the operated position. With the azimuth selector switch in the NAV position the solenoid 130 is operated from the navigator station.

In the mechanical drive between the range motor 123 and the range potentiometer 121, a friction clutch 110 is provided. The purpose of this clutch is to prevent damage to the limit stops of the potentiometer 121 as the motor 123 drives the wiper 122 to the end of its travel.

*X-mode operation*

Should the normal source of heading information break down the pilot may on pushing the X-mode button 135 at the top left hand side of the instrument cause a second source of heading information to be selected. When this button is pushed a series of switches 136, 137, 138, 139 (FIGURE 3) are operated.

The switching transfers the input to the heading control transformer 25 from the normal heading input to the X-Mode standby source of heading input by moving switch 139 to open contact 139a and to make contact 139b for the standby gyro (not shown). The switch lights the XM indicator lamp 140 on the front of the instrument and a D.C. signal is provided to operate a remote amplifier relay. The standby gyro is operated as a direction gyro only. The X-mode relay operates switches 142, 143, 144, 145 to transfer the heading error signal from the heading amplifier 33 to the azimuth amplifier 93. The output from the amplifier 93 is also transferred from the servo motor 26 to the motor 32. The same relay also transfers the normal D.C. supply to the amplifier 93 in such a manner that the supply will be unaffected by faults in any of the other amplifiers. At the same time the relay provides excitation for the motor 32. This excitation is obtained from the power supply which supplies the standby gyro.

Thus in the event of failure of the normal heading source, or in the event of failure of the amplifier 33, a completely different heading circuit for the heading card 13 is obtained by the simple action of pushing in the X-Mode button 135. The only components which are common to the two circuits are the servo motor 32 and the synchro transformer 25 and these are two of the most reliable parts of the individual components of the heading circuits. Protection is also automatically provided for the amplifier 93 in the nature of a dummy load across the output thereof.

On either side of the X-mode button 135 are slaving switches 150, 151 marked + and − (FIGURES 1 and 3). Operation of these buttons actuates switches 152, 153, which operate to precess the standby gyro (which, as has been indicated, is an unslaved directional gyro) in one or other direction, depending upon which button is pushed, thereby enabling the pilot to slave the standby gyro to a magnetic meridian, or otherwise. In effect, therefore, the heading card 13 may be considered as the repeater for either one of two separate gyro compasses.

*Mode-2 operation*

A second mode or mode-2 operation of the present invention consists of utilizing the instrument in accordance with the invention to cause the aircraft to make an automatic turn to a preselected heading. This turn is accomplished by sending a turn signal to the aircraft auto-pilot by means of momentary pressure on the mode-2 button 160 on the front of the instrument (FIGURES 1 and 3).

The switch 161 associated with the mode-2 button is momentarily pressed and this energizes three relays (shown for simplicity as one relay 163) which closes switches 164A, 164B and 164C (shown as separate switches for simplicity). An interlock, not shown, is provided and operates to exclude a second instrument according to the invention, if one is provided. The relays are held on when the mode-2 button is released by a switch 166 until completion of the mode-2 operation. A D.C. supply for the mode-2 circuit is obtained from the aircraft auto-pilot power supply and is fed through a switch which is operated by the auto-pilot control handle (not illustrated). When this handle is moved from the detent position the switch operates and removes the D.C. supply for the auto-pilot circuit thus permitting a pilot at any time to discontinue a mode-2 operation by the simple action of steering the aircraft by means of the auto-pilot control handle.

When the mode-2 operation is started by pushing the button 160 a voltage is applied to the rotor of the synchro 70 through a phasing network. The differential synchro 70 has its rotor positioned by the azimuth drive through gears 86, 87 and its stator is rotated by gear 73 which forms part of the drive to drive shaft 41 and in this position corresponds with the analogue of drift angle. When the azimuth pointer and the drift index are in line, that is to say when the aircraft is flying the command track, the rotor position of the synchro 70 with respect to its stator will be such that with the rotor energized there will be no output signal from the two windings of the stator which are used to generate the analogue output signal to the auto-pilot. If the rotor is not in this null position, an analogue error signal of the difference in the form of a voltage will be transmitted by the synchro 70 to the auto-pilot which will turn the aircraft until the signal is reduced to zero, thus bringing the aircraft onto the command track.

The mode-2 release switch 166 is integral with the potentiometer 71 and consists of a rotor spindle and a ring with a missing segment 2° in width. It is similar in construction to single turn potentiometer except that the resistance element has more resistance throughout. When the wiper of this switch is in the break in the ring the switch will be open. Switch 166 like the mode-2 synchro 70 has its rotor positioned by the azimuth pointer drive 86, 86A and has its outer case 82 positioned by the drift drive through gears 75, 80 and 83. With the pointer in line with the drift index the switch will be open, that is, the wiper will be in the 2° non-conducting section.

When the error signal from the synchro 70 is reduced to zero, the switch 166 is opened, breaking the electric supply to the relays thus allowing them to drop to normal position and remove the excitation from the synchro 70. In the operated position one of the switch controls 164B also provides for the lighting of the mode-2 indicator lamp 168 on the face of the instrument. On the return of the relays to their unoperated position the control of the auto pilot is transferred back to the source of control effective prior to the pushing of the mode-2 button 160.

As a safety factor to prevent the amplifier 93 from changing the position of the indicator 18 during a mode-2 turn and cause the aircraft to come to a track other than the command track selected at the time the mode-2 button was pressed, the input signal is also removed from the amplifier by one of the relays. In this operation the normal error input terminals of the amplifier 93 are shorted to ground by switch 164A and the azimuth command circuit is immobilized. At the completion of a mode-2 turn the azimuth circuit returns to its normal operating condition and the pointer 18 takes up the bearing indication whether or not this has changed during the mode-2 turn.

*Fine steering circuit*

Associated with the instrument of the invention but not forming a physical part thereof is a fine steering indicator 170 (FIGURE 3). This fine steering indicator comprises a sub-system of the instrument of the invention and is of a standard type Course Indicator. The potentiometer 71 is used to control the localizer pointer 171 on the course indicator 170. The potentiometer 71 is combined as diagrammatically indicated by 71D with the mode-2 release switch 166 in the instrument (FIGURE 3) and power is supplied to the potentiometer 71 from a D.C. supply source. As with the synchro 70 the outer case of the potentiometer 71 rotates with the drift system in the instrument and the moving contact is driven by the azimuth system in the instrument. The output voltage from the potentiometer thus represents the difference between the position of the pointer 18 and the position of the drift index 15. Alignment is such that when the pointer 18 agrees with the position of the drift index 15 the wiper 172 on the potentiometer is opposite its centre tap. The output signal from the potentiometer 71 is fed through the relay to the course indicator 170.

The fine steering signal is fed through contacts of a relay 173 which is actuated by the pilot selector knob of the instrument. When the pilot selector knob is pulled out the relay 173 transmits the fine steering signal from the fine steering potentiometer to the course indicator (see FIG. 3a).

What I claim as my invention is:

1. A destination indicator for an aircraft, said indicator comprising movable dial means having a scale thereon graduated in degrees of azimuth; fixed index means for said scale in the form of a representation of an aircraft centrally fixed at twelve o'clock in front of the face of said dial means; servo drive means for said dial means arranged continuously to drive said dial means to a position corresponding to the heading of the aircraft in response to heading data supplied from a selected source within the aircraft; manually operable selector switch means electrically connected to change the selected source of heading data to which said servo drive means responds; a pointer angularly adjustable about the central axis of the dial means; means for adjusting said pointer to indicate a command azimuth heading on said scale; a drift angle marker mounted for relative concentric rotation about the dial means; a means including a drive shaft for driving said marker to indicate an angular position with respect to said fixed index to represent a drift angle in degrees subtended at the centre of rotation of said dial means right or left of said fixed index on said scale, whereby a presentation relative to aircraft track is obtained from the relative visual positions of movable dial, pointer, and drift angle marker, when said drift angle marker is used as a reference datum.

2. A destination indicator for an aircraft, said indicator comprising movable dial means having a scale thereon graduated in degrees of azimuth; fixed index means for said scale; servo drive means for said dial means arranged continuously to drive said dial means to a position corresponding to the heading of the aircraft in response to heading data supplied from a selected source of magnetic heading data or heading data from a free directional gyroscope within the aircraft; manually operable selector switch means electrically connected to change the selected source of heading data to which said servo drive means responds; adjustable index means operably associated with said dial means; means for adjusting said adjustable index means to indicate a command azimuth heading on said scale; a drift angle marker mounted for relative concentric rotation about the dial means; and means including a drive shaft for driving said marker to indicate an angular position with respect to said fixed index to represent a drift angle in degrees subtended at the centre of rotation of said dial means right or left of said fixed index on said scale, whereby a presentation relative to aircraft track is obtained from the relative visual positions of movable dial, adjustable index means and drift angle marker when said drift angle marker is used as a reference datum.

3. A destination indicator as claimed in claim 2 in which slaving switch means are provided on the instrument, said slaving switch means being adapted, on operation, to precess said free directional gyroscope to a selected heading.

4. A destination indicator for an aircraft, said indicator comprising; movable dial means having a scale thereon graduated in degrees of azimuth; a drive shaft for said dial means; fixed index means for said scale; drive means for said dial means arranged to continuously drive said drive shaft and hence said dial means to a position corresponding to the heading of the aircraft in response to heading data supplied from a selected heading source within the aircraft; adjustable index means operatively associated with said dial means for said adjustable index means; drive means adapted to normally drive the index drive shaft; differential means connected between said drive shaft for said dial means and said drive shaft for said adjustable index means; manually operable emergency selector switch means arranged, on operation, to change the selected heading source, to render said adjustable index means inoperative, and to drive said dial means by said drive means normally used for driving said adjustable index means.

5. A destination indicator for an aircraft, said indicator comprising; movable dial means having a scale thereon graduated in degrees of azimuth; a drive shaft for said dial means; fixed index means for said scale; drive means for said dial means arranged continuously to drive said drive shaft and hence said dial means to a position corresponding to the magnetic heading of the aircraft in response to heading data supplied from a selected source within the aircraft; adjustable index means operatively associated with said dial means; a drive shaft for said adjustable index means; differential means connected between said drive shaft for said dial means and said drive shaft for said adjustable index means, said differential means having an input shaft; synchro drive means for said input shaft arranged to drive the latter in response to input data supplied from a source of bearing data within said aircraft; synchro drive means for said drive shaft for said adjustable index means arranged to drive the latter in response to input data supplied within the aircraft from a source of direction data relative to the heading of the aircraft; and selector switch means arranged to selectively energize one or other of said synchro drive means from a selected source of input data.

6. A destination indicator as claimed in claim 5 further comprising: a counter and means for setting into said counter an analogue of distance of the aircraft from a selected target, and shutter means adapted to be opened to reveal said counter when said selector switch means has been energized to energize said synchro drive means for said differential input shaft.

7. A destination indictor for an aircraft, said indicator comprising; movable dial means having a scale thereon graduated in degrees of azimuth; a drive shaft for said dial means; fixed index means for said scale; servo drive means for said dial means arranged to continuously drive said drive shaft and hence said dial means to a position corresponding to the magnetic heading of the aircraft in response to heading data supplied from a selected source within the aircraft; adjustable index means operably associated with said dial means; a drive shaft for said adjustable index means; differential means connected between said drive shaft for said dial means and said drive shaft for said adjustable index means, said differential means having an input shaft; synchro drive means for said input shaft arranged to drive the latter in response to input data supplied within the aircraft from a source of directional data relative to the heading of the aircraft; selector switch means arranged to selectively energize one or other of said synchro drive means from a selected source of input data; and manually operable means adapted to operatively disengage said adjustable index means from said synchro drive means and to permit said adjustable index means to be set to a heading selected by an operator.

References Cited by the Examiner
UNITED STATES PATENTS

| 918,709 | 4/1909 | Smith | 33—224 |
|---|---|---|---|
| 2,688,130 | 8/1954 | Whitaker et al. | 244—77 |
| 2,699,612 | 1/1955 | Kellogg | 33—222.75 |
| 2,853,795 | 9/1958 | Hurlburt et al. | 33—222.75 |
| 2,854,763 | 10/1958 | Konet | 33—222.75 |

LEO SMILOW, *Primary Examiner.*

MILTON BUCHLER, FERGUS S. MIDDLETON, *Examiners.*